Patented May 9, 1950

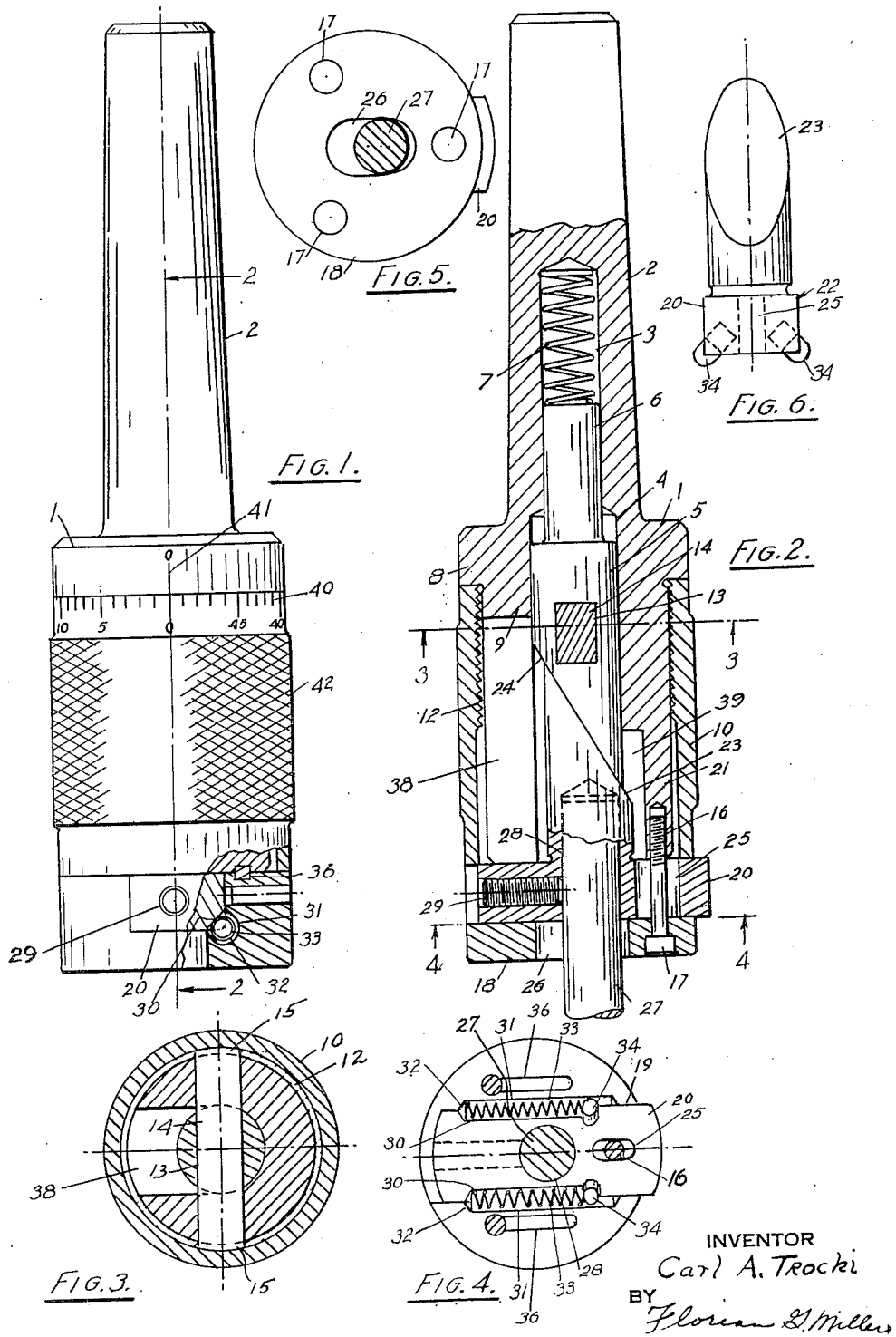

2,507,286

UNITED STATES PATENT OFFICE 2,507,286

ADJUSTABLE BORING TOOL CHUCK

Carl A. Trocki, Detroit, Mich.

Application September 2, 1949, Serial No. 113,822

7 Claims. (Cl. 279—6)

This invention relates generally to boring tools and more particularly to an adjustable chuck for holding a boring tool or cutter in an adjustable position.

It has heretofore been necessary in adjusting a cutting tool in a boring tool holder or chuck to reset the tool after each cut through the use of various hand tools thereby requiring considerable time to change the setting of the boring tool and to bore a hole. These prior chucks have not been too accurate, they have been costly, and a skilled man is required to set up the cutting tool with any degree of accuracy.

It is, accordingly, an object of my invention to provide a boring tool holder which is simple in construction, economical in cost, economical in manufacture, and efficient in operation.

Another object of my invention is to provide a boring tool holder which permits lateral adjustment of the boring tool within extremely close tolerances.

Another object of my invention is to provide graduations on a boring tool chuck for quickly and accurately setting a boring tool cutter for different depths of cuts.

Another object of my invention is to provide a novel combination and arrangement of parts in a boring tool chuck.

Other objects of my invention will become evident from the following detailed description, taken in conjunction with the accompanying drawings, in which Fig. 1 is a plan view with parts thereof broken away for better illustration of my novel boring tool chuck;

Fig. 2 is a view taken on the line 2—2 of Fig. 1;

Fig. 3 is a view taken on the line 3—3 of Fig. 2;

Fig. 4 is a view taken on the line 4—4 of Fig. 2;

Fig. 5 is an end elevational view of my novel boring tool chuck; and

Fig. 6 is a detailed plan view of the slidable boring tool cutter holder.

Referring now to the drawings, I show in Figs. 1 to 6 inclusive a cylindrical body member 1 with a tapered shank 2 for attachment to the spindle of a suitable machine tool. The tapered shank 2 may be a short heavy tapered shank or it may be a longer tapered shank as shown in the drawings without departing from my invention. The cylindrical member 1 has a longitudinal bore 3 with a counterbore 4 for slidably receiving a longitudinally movable wedging bar 5 having a reduced portion 6 slidably engaging the bore 3 of the member 1' A coil spring 7 is nested in the bore 3 and urges the wedging bar 5 outwardly. The member 1 has an outwardly projecting shoulder 8 cut away to form an outwardly projecting portion 9 for receiving the end of a cylindrical thimble or sleeve 10 having an internally threaded portion 12. The sleeve 10 is free to rotate on the projection 9. The wedging bar 5 has a rectangular shaped, transverse aperture 13 extending therethrough for slidably receiving a driving bar 14. Opposite ends 15 of the bar 14 are rounded and threaded for threadable engagement with the internally threaded portion 12 of the sleeve 10. The outer end 21 of the member 1 has a spaced, longitudinally extending, threaded recess 16 for threadably engaging screw bolts 17 for attaching a concentric end cap 18 to the end 21 of the member 1. The cap 18 has a diametrically extending groove 19 for slidably receiving radially extending, rectangular shaped arms 20 of cutting tool holder 22. The cutting tool holder 22 has an oblique end face surface 23 corresponding to and engaging the oblique end face surface 24 of the wedging bar 5. An arm 20 of the member 22 has an elongated aperture 25 therein for the passage of a screw bolt 17. The end cap 18 has an elongated apertured portion 26 through which extends a boring bar 27 which is held in the recess 28 of the tool holding member 22 by a lock screw 29. The arms 20 of the tool holding member 22 has the edges 30 intermediate the ends thereof cut away corresponding to cut away edge portion 31 of the groove 19 of the cap 18 to form chamber 32 for the reception of return springs 33. The tool holding member 22 has outwardly extending pins 34 for engaging one end of the return springs 33. The springs 33 urge the tool holding member 22 to a position as shown in Fig. 2 in opposition to the force of the spring 7 urging the oblique face 24 of the wedging bar 5 against the oblique face 23 of the tool holding member 22. Corresponding rectangular shaped grooves 36 are provided in the cap 18 and the end 21 of the member 1 to receive rectangular shaped bars to prevent any relative rotative movement therebetween. The outer end 21 of the member 1 is cut away at 38 and 39 to permit transverse movement of the tool holding member 22.

The outer side of the sleeve or thimble 10 is knurled at 42 to provide frictional engagement between the fingers and the sleeve 10. The sleeve 10 also has graduations 40 adapted to be registered with the center line 41 on the outer shoulder 8 of the member 1.

In the operation of my novel boring tool chuck, a boring tool or cutter 27 is disposed in the aperture 28 of the boring tool holder 22 and it is held therein by a locking screw 29. The shank 2 of the member 1 is disposed in any conventional machine tool spindle. The cutting bar 27 is then set in a position to make a cut on a workpiece. After the first cut is taken, the bore is measured and the depth of cut determined. The sleeve 10 is then rotated a predetermined amount whereupon the driving bar 14 is moved forwardly through engagement of the threaded ends 15 thereof with the threaded portion 12 of the sleeve 10, the driving bar 14 moving therewith the wedging bar 5. Engagement of the oblique end face 24 of the wedging bar 5 and the oblique end face 23 on the tool holding member 22 causes the tool holding member 22 to move transversely thereby moving the cutting tool 27 into the workpiece. The graduations 40 on the sleeve 10 permit accurate measurement of the movement of the cutting tool 27 into the workpiece.

It will be evident from the drawing and from the foregoing description that the construction of my novel boring tool chuck is simple, it is simple to operate, it may be utilized for extremely small tolerances, it has no apertures through which dust or chips may get into the inside of the chuck, and it may be operated by a comparatively inexperienced person.

Various changes may be made in the specific embodiment of my invention without departing from the spirit thereof or from the scope of the appended claims.

What I claim is:

1. An adjustable boring tool chuck comprising a longitudinally bored body member having transversely extending apertures, a spring urged wedging member slidable in the bore of said body member, a tool holder having a portion thereof slidably mounted in said transverse apertures of said body member and having a wedging portion engaging said wedging member, springs for urging said tool holding member opposite to the transverse force of said wedging member, means for securing a boring tool in said boring tool holder, and means for moving said wedging member longitudinally.

2. An adjustable boring tool chuck as set forth in claim 1 wherein the means for moving said wedging member longitudinally comprises a longitudinally movable driving bar extending therethrough having the ends thereof threaded and an internally threaded sleeve threadably engaging said driving bar.

3. An adjustable boring tool chuck comprising a cylindrical, longitudinally bored body member having a tapered shank, an apertured end cap having a transversely grooved portion connected to the end of said cylindrical member opposite to said shank thereof, a wedging bar longitudinally movable in the bore of said body member, a spring for urging said wedging bar forwardly in said body member, a tool holding member having outwardly extending portions for transverse movement in the transverse groove in said cap member and having a longitudinally extending wedging portion for wedging engagement with said wedging member, spring means for urging said tool holding member transversely against the normal force of the spring urging said wedging member forwardly, means for securing a cutting tool in said tool holding member, and means for moving said wedging bar longitudinally of said body member to move said tool holder transversely.

4. An adjustable boring tool chuck as set forth in claim 3 wherein said means for moving said means for moving said wedging member longitudinally comprises a driving bar extending diametrically through said wedging member having the ends thereof threaded for threadable engagement with an internally threaded thimble disposed on the outer side of said cylindrical member.

5. An adjustable boring tool holder comprising a body member having a longitudinally extending bore and transversely extending apertures, a wedging member slidably mounted in said bore, a tool holder having laterally extending portions slidably mounted in said transversely extending apertures and having a wedging portion corresponding to and in engagement with the wedging portion of said wedging member, and means for moving said wedging member longitudinally of said body member to move said tool holder transversely.

6. A boring tool chuck comprising a longitudinally bored cylindrical member, a wedging member having an oblique end face, a transversely movable tool holder having an oblique end face corresponding to and in engagement with said oblique end face of said wedging member, and means for moving said wedging member longitudinally to move said tool holder transversely in said cylindrical member.

7. A boring tool chuck as set forth in claim 6 wherein means for moving said wedging member longitudinally comprises an internally threaded sleeve rotatably mounted on said cylindrical member and a diametrically extending member engaging said wedging member and having the ends thereof threaded to threadably engage the internal threaded portion of said sleeve.

CARL A. TROCKI.

REFERENCES CITED

The following references are of record in the file of this patent:

UNITED STATES PATENTS

| Number | Name | Date |
|---|---|---|
| 971,120 | Day | Sept. 27, 1910 |
| 984,000 | Hull | Feb. 14, 1911 |
| 1,718,089 | Tesoroni | June 18, 1929 |
| 2,010,983 | Ferguson | Aug. 13, 1935 |